July 1, 1969     H. G. KLUG ET AL     3,452,588
MOISTURE INDICATOR MATERIAL MOVEMENT SYSTEM
Filed Jan. 3, 1966
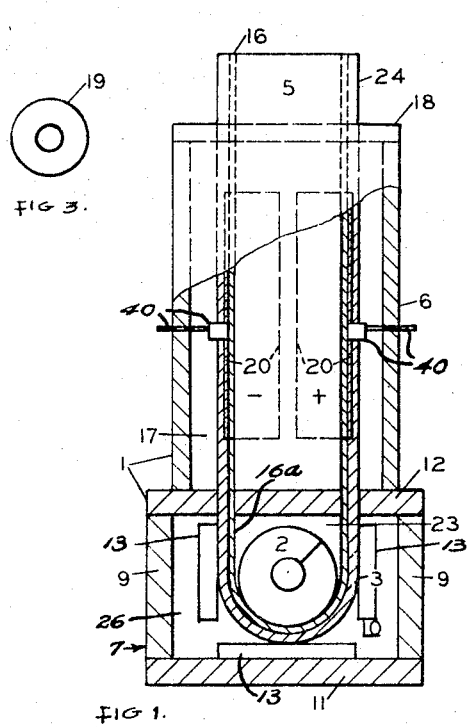
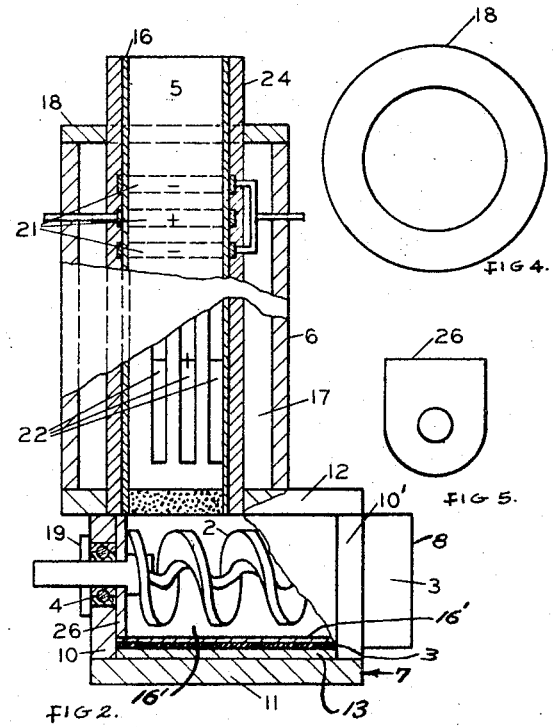
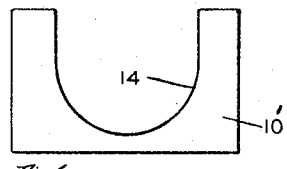
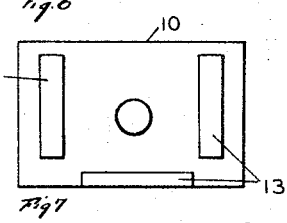
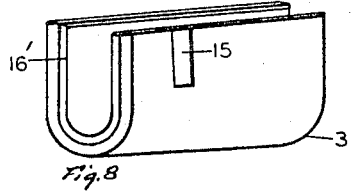
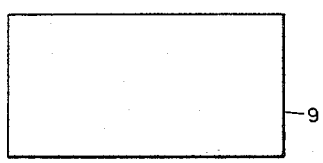
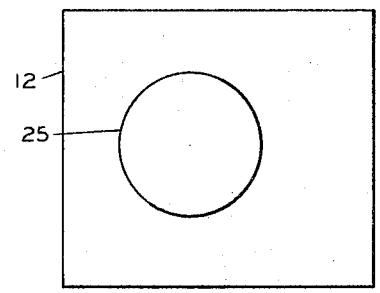
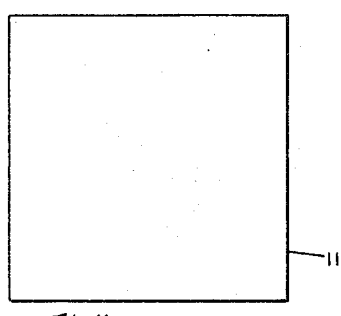
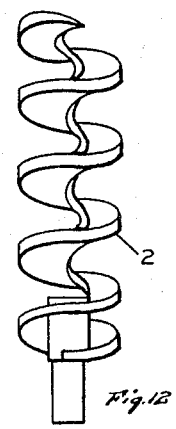
INVENTORS:
HENRY G. KLUG
ARTHUR D. WILLIAMS

United States Patent Office 3,452,588
Patented July 1, 1969

3,452,588
MOISTURE INDICATOR MATERIAL
MOVEMENT SYSTEM
Henry G. Klug, 2029 N. 67th Ave., Omaha, Nebr.
68132, and Arthur D. Williams, 821 Brinton Ave.,
Dixon, Ill. 61021
Continuation-in-part of application Ser. No. 476,534,
Aug. 2, 1965. This application Jan. 3, 1966, Ser.
No. 518,282
Int. Cl. G01n 25/56
U.S. Cl. 73—73                                    3 Claims

ABSTRACT OF THE DISCLOSURE

An indicator for indicating the moisture content of fluid materials by measuring the varying capacitance in the materials as the materials are flowing therethrough.

Cross-reference to related application

This application is a continuation-in-part of the applicants' earlier application, Ser. No. 467,534, filed Aug. 2, 1965, now abandoned entitled, Set Level Moisture Indicator in Fluent Materials.

Field of invention

This invention is in the field of determining and recording the moisture content of various grains, grain products, or other fluent materials. The very accurate moisture measurement is vital for the purpose of the safe storage of such products with minimum spoilage.

Description of the prior art

One disadvantage of moisture indicators of the prior art has been that they have used a conventional auger formed of material wound helically about and fastened to a central shaft. Such indicators give faulty readings because of plugging up of their augers.

This plugging up of an auger is a problem that is particularly great with materials containing molasses, fish oils, and fluids of similar sticky adhesive qualities.

Breakage of augers has been a deterent to commercial use of auger powered indicators.

When wet feed into an auger it can pack and pile up thousands of pounds of force, splitting the auger housing open.

Feed that has small grains is a particular problem. With more and more grain coming into the auger area the packing pulls tighter and tighter until there is breakage.

Prior to our discovery no solution to this problem has been found, nor has the problem been adequately solved by the use of high power on an auger and the making of the auger from chrome steel of the greatest strength.

Undesirable lumps of irregular and oversized shapes are commonly found in cereal grains being processed, and in indicators of the prior art there has been no suitable provision for handling these oversized lumps and the presence of the oversized lumps cannot be entirely avoided.

A further prior art problem has been the adhesion of material to the vertical sensing tube of the indicator, as is particularly a nuisance when the materials are wet or sticky. Fish oil, for example, tends to cling to the sides of sensing tube. Dust then sticks to the oil, resulting in a build up of sticky material clogging the sides of the sensing tube and resisting movement of material through the tube. In the prior art sensing tubes have been made of such electrically insulating plastic materials to which sticky material such as molasses and fish oils tend to cling.

A further prior art problem has been that when objects of high electrical conductivity have been placed excessively near the sensing plates of a moisture indicator they have interferred with the indication. For example if a tool such as a wrench or screw driver is laid too near the sensing tube operation is inaccurate because steel has a much higher electrical conductivity than the material being tested which latter might for instance be moist grain. Sometimes a sensing tube is placed nearer to steel piping without the operator realizing is influence.

Summary

In a moisture indicator a material movement system having an upstanding tube supporting two oppositely charged electrical conductivity sensing members, a hollow auger housing beneath the tube for receiving material therefrom, the inner end of said auger being rotatably mounted on said housing, said auger having an axial opening therethrough extending beneath the tube to the discharge end of the auger to prevent clogging of the auger.

We have discovered that an auger as described will solve the long standing prior art problems that have for years kept auger type moisture indicating systems from the pubilc market. We have discovered that a moisture indicator with our auger system allows the difficult materials to move out freely without the plugging of the auger thus eliminating breakage.

We have discovered that when the interior of the vertical tube is formed of the material having a low friction characteristic similar to the low characteristic of Teflon or Kel-F(16) that material flowing through the tube is prevented from adhering to the tube, thus increasing the accuracy of an indicator, and keeping the indicator more clean.

We have further discovered that by placing an elongated annular shroud around the tube in the area of the sensing plates will serve as a barrier to prevent objects of high electrical conductivity from being placed excessively near the plates for further assuring accuracy of moisture measurement.

Brief description of the drawing

FIGURE 1 is an end view of the outlet end of the moisture indicator shown with portions of the sensing tube and curved sensing plates and housing, screw guide and lining broken away along a plane through the center axis of the sensing tube and perpendicular to the axis of the auger, and with other portions showing in section.

FIGURE 2 is a side elevation of a modification of the auger of FIGURE 1 with various parts broken away and other parts showing in a section taken along a plane through the center axis of the guide tube and parallel to the auger.

FIGURE 3 is a detail of the auger shaft extending through the bearing flange.

FIGURE 4 is a top plan view of an annular cap which extends across a shroud of the indicator.

FIGURE 5 is a detail showing a bearing cover of the invention as it would be seen from the right side in FIGURE 2 separate from the rest of the indicator.

FIGURE 6 is a detail of an outer end piece as it would be seen from the right-hand side in FIGURE 2, if all other parts were removed.

FIGURE 7 is a detail of an inner end piece as it would be seen from the right-hand side in FIGURE 2, if all other parts were removed.

FIGURE 8 is a perspective view of a screw guide and its lining.

FIGURE 9 is a detail showing one of the sides of the lower housing portion of the invention as it would be seen from the right in FIGURE 1 with all other parts removed.

FIGURE 10 is a detail of a top plate of the housing as it would be seen from the top in FIGURE 2 with all other parts removed.

FIGURE 11 is a detail of the housing as it would be seen from the underside in FIGURE 2.

FIGURE 12 is a detail of the auger as seen in top plan view taken separately from the remainder of the indicator.

A moisture indicator sampling cell unit is shown at 1 and has a centerless screw or auger 2, an auger guide 3, an auger bearing 4, a sensing tube or sensing cell 5, a sensing tube shroud 6, and a mounting housing support box 7.

The centerless screw may be rotated at an optimum rate by suitable means not shown.

The centerless screw, described later, is used as a feed rate governing device and to discharge material from the housing exit 8. The screw guide 3, as the term implies, guides the screw and encompasses the material about the screw. The rectangular housing 7 serves as a mounting base for the screw guide 3 and bearing 4.

The housing may be constructed of conventional materials as desired, such as metal, wood, or plastic, as long as rigidity is accomplished.

The description herein relates to a housing fabricated from the material known by the brand name, Plexiglas.

The housing 7 has sides 9, ends 10 and 10', bottom 11, and top or top plate 12. One end piece 10 is drilled at 10a to facilitate the pressing of a bearing into it, and supports 13 are attached on the interior side of the end 10 to support the screw guide.

The other end piece 10' has a U-shaped notch 14 in its upper side to form a resting cradle for the screw guide 3. The top piece 12 has a circular opening 25 extending vertically therethrough receiving therethrough the vertical sensing tube 5. The parts of the housing 7 are attached on abutting edges by adhesives, or other suitable means. The screw guide 3 may be of metal, wood, or plastic, formed in a U-shape to fit into the housing 7. One end of the screw guide fits into the space between the supports 13 on the end plate 10; the other end fits into the U-saddle of the opposite end plate.

The top piece 12 holds the screw guide 3 down in its proper position. The interior of this screw guide 3, adjacent to the screw, is lined with a lining 16' of a low friction material, such as Teflon, Kel-F, or similar material, to prevent adhesion of product sample to the guide as it is propelled through the sampling cell.

The cylindrical shroud 6 about the sensing tube 5 is also attached to the top housing plate 12, establishing a cylindrical or other shape void 17 between the shroud and the outer side of the sensing tube. This shroud is attached to the top piece 12 of the housing by adhesives or otherwise. The shroud 6 is shorter in length than the sensing tube 5, allowing the sensing tube 5 to protrude above the shroud, and the space between the top of the shroud 6 and the outer periphery of the sensing cell 5 is closed by an annular cap 18, and the void 17 between sensing cell 5 and shroud 6 may be filled with an insulative material such as Styrofoam or foam urethane.

We have found from actual field tests and from further research that this void 17 between the sensing tube 5 and shroud 6 is prone to accumulate moisture condensation and to receive leakage from between the cap 18 and the shroud 6 and sensing tube 5 and also receives leakage at the point where the sensing tube 5 fits into the top plate 12.

Filling this void 17 with an aerated substance such as Styrofoam will seal out moisture from affecting the sensing tube and not seriously affect any reactive qualities on the electrical circuit either in its electrical field or on the connections.

In the housing 7 an interior bearing cover 26 against the end 10 is provided. This cover serves two purposes, one is to cover the bearing 4 and the other is to provide a thrust plate for a shoulder 30 on the auger axle 32 to press against. The cover 26 serving as a thrust plate is also of a low friction value material; thus eliminating a surface requiring lubrication.

The moisture sensing cell 5 is a vertical tube through which the material flows by gravity entering its upper end. The sensing cell 5 is composed of an exterior rigid tube 24 and carries the sensing plates 20. The interior tube or lining 16 covers the interior of the support tube 24 and is of a lower friction material and is moisture tight.

Inside of the tube 24 is an arrangement of two opposed metallic sensing members or curved plates 20, as in the modification of FIGURE 1.

In FIGURE 2 is a modification of FIGURE 1 in which the sensing members 21 are vertically spaced horizontal rings 21 each of alternate electrical charge with respect to any adjacent ring 21. On the lower part of the tube 24 in FIGURE 2 three strips of metal 22 are shown which could be used as sensing members.

The sensing members 20, 21 or 22 form parts of a circuit, not shown, in a conventional manner to establish a measurable electrical effect as material flows downward through the sampling tube.

These plates 20, rings 21, or strips 22 are permanently molded into the tube and are not directly physically exposed to any material flowing through this tube. The lining 16 is of Teflon, Kel–F, or similar low-friction insulating material preventing direct contact between the material flowing through the cell and the sensing plates 20, rings 21, or strips 22. By using a low friction material on the interior of the sensing tube it eliminates material bridging any resulting voids in the flowing material.

The outer shroud 6 of the sensing tube 5 must be constructed of material which has very low moisture absorption characteristics. The sensing tube 5 is inserted into an opening 25 through the top plate 12 and is attached to the plate 12 all around its circumference with an adhesive which will seal off exterior foreign matter and provide a permanent, rigid attachment.

Connections to the plates 20 are made by two conductors 40 extending from plates 20 through the tube 24 and the shroud 6. The conductors 40 pass through the shroud 6 and constitute the points of electrical circuit attachment. Connections to the rings 21 are by conductors 41 extending through tube 24 and shroud 6. The openings in the shroud for the conductors 40 and 41 must be moisture tight.

From extensive research and field tests of other moisture measuring system, including the Set Level Moisture Indicator covered by the petitioners' application, Ser. No. 476,534, filed Aug. 2, 1965, we have ascertained that moisture sampling devices utilizing a conventional screw or screws having flights integrally formed about a solid center shaft or shafts are prone to plugging causing erroneous readings.

In some instances extensive damage to the sampling cell has resulted from the continued operation of single or multiple-type conventional screws in sampling cells after plugging has occurred.

Such stoppage or plugging increases in frequency with an increase in the adhesive tendency of various feeds and materials, particularly those containing molasses, fish oils, and the other materials or compounds.

We have determined by research and actual full scale operation that a moisture sampling cell with a centerless screw of various diameters will operate efficiently on almost all materials without plugging and without exhibiting any appreciable tendency toward product build-up on the screw.

Extensive search for a commercially available centerless screw 2 of the size and nature suitable for a moisture sampling cell has revealed that a centerless screw of this type is not available and this necessitated our design and manufacture of a special centerless screw having the desired characteristics.

Production of the centerless screw is a lathe operation with the flights of the screw formed about a center shaft. In the next operation, a bearing surface and stub drive are formed at one end of the screw, after which the center shaft is removed by boring, except for that portion of the center allowed to remain as a support for one or more screw flights at the drive end of the screw.

In the processing of cereal grains and other materials for human or animal consumption, the formation of undesirable lumps or irregular over-size shapes cannot always be avoided entirely and present difficulties to conventional moisture sampling cells. So we have discovered that a relief space 23 through which such foreign or undesirable matter of nominal size can be discharged can be provided by substantially spacing the top of the screw 2 from the plate 12.

This unit may be used on inorganic as well as organic matter of various abrasive natures by changing the screw diameter, the sensing tube lining, and the screw guide lining.

We claim:

1. In a moisture indicator, an upstanding tube of electrically insulating material, at least two oppositely charged electrically conductive sensing members disposed at the sides of and mounted on said tube and spaced from the inner wall of said tube and said members also being spaced apart with respect to each other to measure capacitance, a hollow auger housing disposed under said tube with its interior in communication with the interior of said tube, said auger housing having a discharge opening at one of its ends, an auger in said housing and having a discharge end nearest said discharge opening, means rotatably mounting the other end of said auger on said housing for axial rotation thereof, said auger having an axial opening therethrough extending from beneath said tube to the discharge end of said auger to prevent clogging of said auger.

2. The combination of claim 1 in which an elongated annular shroud is disposed around said tube and connected thereto and spaced therefrom for serving as a barrier to prevent objects of high electrical conductivity from being placed excessively near said plates.

3. The combination of claim 1 in which the interior of said tube is formed of a material having a low friction characteristic similar to the low friction characteristic of Teflon to prevent material flowing through the tube from adhering to said tube.

References Cited

UNITED STATES PATENTS

| | | | |
|---|---|---|---|
| 2,526,636 | 10/1950 | Colman | 73—73 |
| 2,931,718 | 4/1960 | Greaves | 73—73 |
| 3,067,622 | 12/1962 | Ballestra | 73—73 |
| 2,726,366 | 12/1955 | Rogers | 324—61 |
| 2,788,487 | 4/1957 | Grogg | 324—61 |

FOREIGN PATENTS 865,391 2/1953 Germany.

RICHARD C. QUEISSER, *Primary Examiner.*

E. D. GILHOOLY, *Assistant Examiner.*

U.S. Cl. X.R.

324—61